Patented Jan. 8, 1952

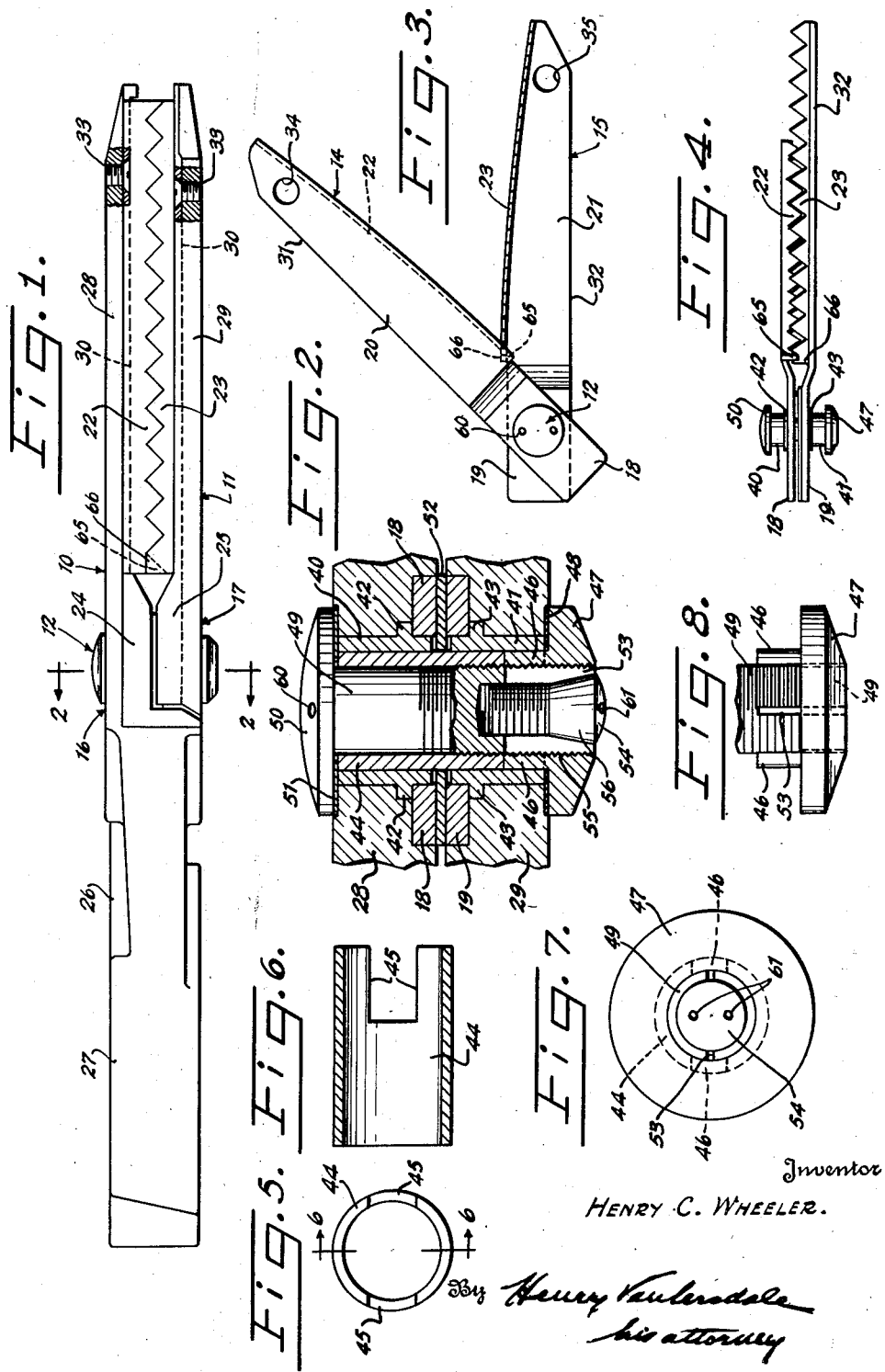

2,582,184

UNITED STATES PATENT OFFICE 2,582,184

PINKING SHEARS

Henry C. Wheeler, Bridgeport, Conn., assignor to Acme Shear Company, Bridgeport, Conn.

Application November 4, 1948, Serial No. 58,169

4 Claims. (Cl. 30—271)

This invention relates to shears and more particularly to pinking shears.

In pinking shears, as in straight edged shears, it is important that the cutting edges of the blades make accurate cutting contact throughout the entire length of the cutting span. Wherever the blades do not have proper cutting contact the material being cut is likely to be torn or to become wedged between the blades without being cut.

Further, in pinking shears, if material to be pinked is inserted so far into the shears that a portion of the material is disposed inwardly of the inner termini of one or both of the lines of pinking teeth that portion of the material which is disposed inwardly beyond the innermost pinking tooth or teeth will not be pinked.

Blades of shears are usually adjusted by manipulating and adjusting the pivot assembly whereby the blades are pivotally connected.

Because the cutting edges of pinking shears are serrated it is more difficult to fashion and to adjust the blades of pinking shears so that there will be proper and effective cutting engagement between the cutting edges throughout the entire extent of the cutting edges than it is to fashion and adjust the blades of straight cutting shears. Also, comparatively slight displacement of the blades of pinking shears from their proper precision adjustment is likely to impair the cutting coaction of the blades. This could easily happen if an amateur or unauthorized person should attempt to tamper with the adjustment.

Accordingly a principal object of this invention is to provide a pivot assembly for pivotally connecting the blades of shears, and particularly pinking shears, whereby the blades may be placed in proper and precision adjustment at the factory and so constructed and arranged as to prevent, or, at least to make it extremely difficult for the housewife or other unauthorized person to manipulate and adjust the pivot assembly in an attempt to change the adjustment of the blades. The intent is that when re-adjustment seems necessary the blades shall be returned to the factory or to some other authorized place for re-adjustment.

Another principal object of this invention is to provide in pinking shears having cooperating rows of pinking teeth which do not extend all the way to the pivot connection, simple and effective means for preventing the shears to be opened to such an extent that material may enter the shears inwardly beyond the rear ends of the rows of pinking teeth, and thereby insure the pinking of the material from its inner edge.

A further object of this invention is to provide pinking shears which are simple, durable, light and inexpensive in construction, which operate effectively, smoothly and easily on a wide variety of materials and on a wide range of thickness of materials, and which are attractive in appearance and are easy to handle and to use.

Other objects of this invention will be in part obvious and in part pointed out hereinafter.

In accordance with this invention the pinking blades are provided with co-acting rows of pinking teeth, one row on each blade, the teeth projecting from the blade bodies across the cutting plane of the shears. At the inner terminus of the row of teeth on one of the blades there is a tooth so wide that it acts as a stop for the corresponding tooth or last half tooth of the row of teeth of the other blade and prevents this latter tooth from passing by and thus prevents further opening of the blades, and consequently material cannot be inserted between the open blades beyond or inwardly of the rows of pinking teeth. Thus the material cannot be inserted between the blades without its inner edge being in position to be pinked, and pinking of the material from its inner edge is assured.

The pivot assembly is so constructed and arranged that there is nothing a person may turn, screw or twist, without the greatest of inconvenience and difficulty to alter the adjustment of the blades, unless special tools are used.

The invention accordingly consists in the features of construction, arrangement of parts and combinations of elements which will be more fully described hereinafter and the scope of the application of which will be set forth in the claims that follow.

In order that a clearer understanding of this invention may be had, attention is hereby directed to the accompanying drawings, forming a part of this application and illustrating certain possible embodiments of this invention, and in which:

Figure 1 is an edge plan view of a pair of shears embodying this invention;

Figure 2 is an enlarged sectional view at the pivot assembly, and is taken on the line 2—2 of Fig. 1;

Figure 3 is a plan view of the cutting blades in wide open relation, and the pivot assembly, the holding blades being omitted;

Figure 4 is an edge plan view of the same, showing the stop means whereby the extent of blade opening is limited;

Figure 5 is a plan view of the inner sleeve of the pivot assembly;

Figure 6 is a sectional view of the same and is taken on the line 6—6 of Fig. 5;

Figure 7 is an elevation of the pivot assembly at the nut side thereof; and

Figure 8 is a side view partly broken away of the nut of the pivot assembly with the slit end of the tension screw engaged therein.

Similar reference characters refer to similar parts throughout the several views of the drawings.

Referring to the drawings, the shears comprise two complemental blades, indicated generally at 10 and 11, pivotally connected by a pivot assembly generally indicated at 12. Each blade is composite, including a cutting blade, 14, 15, and a supporting blade, 16, 17 for the cutting blade. Each supporting blade centrally, and each cutting blade toward its rear end is provided with an aperture to receive the pivot assembly.

The cutting blades may be comparatively thin strips of suitable metal having flat portions 18, 19 in which the pivot apertures are formed and outwardly thereof having flat portions 20, 21 each having a row of pinking teeth 22, 23 along one edge and projecting toward the other cutting blade when the cutting blades are in position on the supporting blades.

Each supporting blade has a central portion 24, 25 having an aperture for the pivot assembly, a handle portion 26, 27 rearwardly thereof and a portion 28, 29 extending forwardly thereof. Each portion 28, 29 has a flat surface with an abutment flange, such as 30, 30' along one edge, the cutting blades 14, 15 being adapted to be placed against the inner surfaces of the supporting blades with the flat surfaces 20, 21 of the cutting blades lying flat against the flat surfaces of the supporting blades and with the edges 31, 32 of the cutting blades seating against the shoulders 30, 30' of the supporting blades. When the blades are properly pivotally connected by means of the pivot assembly the rows of pinking teeth of the two cutting blades are so positioned that the teeth will be bisected by the plane of cutting movement of the shears.

The cutting blades are further firmly secured to the supporting blades by suitable screws 33, which extend through suitable apertures 34, 35 formed in the cutting blades toward their ends and engage in threaded holes in the supporting blades.

The pivot assembly includes two bushings 40, 41, one for each blade and each having a pressed fit in the aperture provided therefor in the cutting blade, each bushing having an annular stop flange, 42, 43 seating against the outer surface of the cutting blade. The outer portion of the bushings are adapted to be received in the apertures of the supporting blades, these blades being suitably recessed to accommodate the flanges 42, 43 of the bushings.

These bushings 40, 41 encircle an inner sleeve or bushing 44 which has a pressed fit in bushing 40 so as to be non-rotatively fixed thereto; sleeve 44 and bushing 41 being relatively rotatable. The end of sleeve 44 at bushing 41 has a pair of notches or keyways 45 adapted to receive two internally threaded axial projections or keys 46 of a nut 47, the nut overlapping the supporting blade 29, and, if desired a washer 48 may be disposed between the nut and the blade. A bolt or screw 49 having a head 50 is adapted to be entered from the opposite side of the shears and into the sleeve 44 and engaged with the nut 47 and its threaded projections or keys 46. The head 50 of screw 49 overlaps supporting blade 28 and a washer 51 may be provided between the screw head and the blade. Preferably a suitably apertured wearing plate 52 is disposed between the cutting blades and about the pivot connection.

The entrant end of screw 49 is slit, as at 53, and suitably bored and tapped to receive an expander screw 54 which has a threaded stem such as 55, and a conical expander portion, such as 56, between the head end of the screw and the threaded portion. Thus by screwing the expander screw 54 into the split screw 49 the slit end portion of screw 49 is expanded by the expander portion 56 of screw 54 against the nut 47 and its projections or keys 46 and the screw 49 and nut 47 are positively and firmly locked together.

To prevent unauthorized displacement or turning of either the screw 49 or the expander screw 54 they are provided with special tool receiving holes or notches or sockets or the like which require special tools to be engaged therein to turn the screws. For instance, special holes, such as 60, may be formed in the head 59 of screw 49 and holes, such as 61, in the top of the expander screw 54, so that special tools will be required to turn the screws. A small hexagonal socket requiring a special tool would also meet the requirement, or other forms of special tool sockets may be used. After proper adjustment has been made at the factory the socket holes may be filled with suitable material to conceal them or to make it difficult to engage a tool in them. Additionally it is obvious that the adjustment of the pivot assembly cannot be changed by any pivotal movement of the blades.

The shears are adjusted and tensioned by screwing the screw 49 into the nut 47. The tighter screw 49 is screwed into nut 47 the tighter the blades of the shears are tensioned together. As shown, the rear portions of the cutting blades from the inner end of the rows of pinking teeth rearwardly are seated in recesses provided therefor in the supporting blades, and abutted on their side and rear edges by the walls of the recesses.

The manner of assembling the shears is clear from the above. To effect a readjustment the expander screw 54 is first loosened by means of a special tool. Then the adjustment is made by turning screw 49 one way or the other by means of a special tool, and then the expander screw is again tightened.

As stated hereinbefore, means are provided for limiting the extent to which the shears may be opened. As shown the tooth 65 at the inner end of the row of pinking teeth on cutting blade 14 is a half tooth, but, of course it may be a full tooth, if desired, and the tooth 66 at the inner end of the row of pinking teeth on cutting blade 14 is wider than a full tooth, whereby when the blades are being opened this wider tooth 66 acts as a stop wall and will intercept the tooth or half tooth 65 of the other blade and will prevent the shears from being opened further. Thus no material may be inserted into the shears rearwardly beyond the rows of pinking teeth and pinking of the material from the very end of the inserted material is assured. Of course the extent of opening of the shears may be fixed at any extent of shear opening desired by merely providing at the proper point along one of the rows of pinking teeth a stop wall for the opposite tooth of the other row of pinking teeth. With this arrangement no stop means outside of the rows of pinking teeth themselves is required thus reducing cost and attaining simplicity of structure.

As many changes may be made in the above construction without departing from the scope of this invention it is understood that all matter contained in the above description or shown in the accompanying drawings be interpreted as illustrative and not in a limiting sense.

What I claim is:

1. A pair of shears of the character described, including, in combination, two pivotally connected blades, said blades having blade portions spaced from each other and each having a row of pinking teeth extending toward the other blade portion, a stop on one of said blade portions extending toward the other blade portion in the path of movement of one of the pinking teeth of the row of pinking teeth on said other blade portion whereby the extent to which the blades may be opened is limited.

2. A pair of shears as set forth in claim 2 and in which said stop on one of said blade portions is a widened tooth in the row of pinking teeth on said blade portion.

3. A pair of shears as set forth in claim 2 and in which said stop on one of said blade portions is a widened tooth at the innermost end of the row of pinking teeth on said blade portion.

4. A pair of shears of the character described, including, in combination, a pair of blades pivotally mounted on a common pivot, said blades having blade portions extending forwardly of the pivot and spaced from each other laterally, interacting rows of pinking teeth on said blade portions, the innermost end of each row being spaced on the blade portion a distance forwardly of said pivot, the innermost tooth of one of said rows of pinking teeth being widened and in the path of movement of the innermost tooth of the other row of pinking teeth whereby opening of the shears to the extent of exposing the blade portions intermediate the inner ends of the rows of pinking and the pivot to access by material inserted between the blades for pinking is prevented and pinking of the material from its innermost inserted end is assured.

HENRY C. WHEELER.

REFERENCES CITED

The following references are of record in the file of this patent:

UNITED STATES PATENTS

| Number | Name | Date |
|---|---|---|
| 103,386 | Stow | May 24, 1870 |
| 398,509 | Henckels | Feb. 26, 1889 |
| 837,997 | Zeller | Dec. 11, 1906 |
| 1,107,227 | Ryan | Aug. 11, 1914 |
| 1,545,211 | Storz | July 7, 1925 |
| 1,556,770 | Driest Jr. | Oct. 13, 1925 |
| 1,802,905 | Bryant | Apr. 28, 1931 |
| 1,886,273 | Thomson | Nov. 1, 1932 |
| 2,000,852 | Langbein | May 7, 1935 |
| 2,010,576 | Whyte | Aug. 6, 1935 |
| 2,284,664 | Kissling | June 2, 1942 |
| 2,284,859 | Blair | June 2, 1942 |

FOREIGN PATENTS

| Number | Country | Date |
|---|---|---|
| 13,866 | Great Britain | June 10, 1911 |
| 26,892 | Great Britain | Nov. 27, 1906 |